(12) United States Patent
Hasegawa et al.

(10) Patent No.: US 7,570,288 B2
(45) Date of Patent: Aug. 4, 2009

(54) IMAGE PROCESSOR

(75) Inventors: Hiromu Hasegawa, Osaka (JP);
Munehiro Mori, Osaka (JP); Nobuhiro Minami, Osaka (JP)

(73) Assignee: MegaChips LSI Solutions Inc., Osaka-shi (JP)

( * ) Notice: Subject to any disclaimer, the term of this patent is extended or adjusted under 35 U.S.C. 154(b) by 442 days.

(21) Appl. No.: 11/277,699

(22) Filed: Mar. 28, 2006

(65) Prior Publication Data
US 2006/0262196 A1    Nov. 23, 2006

(30) Foreign Application Priority Data
May 19, 2005    (JP) .............. 2005-146621

(51) Int. Cl.
*H04N 5/217*    (2006.01)
(52) U.S. Cl. .................. 348/241; 382/167; 382/275
(58) Field of Classification Search ............. 348/222.1, 348/223.1, 241, 256, 272, 643, 644, 207.99; 382/167, 275; 358/518
See application file for complete search history.

(56) References Cited
U.S. PATENT DOCUMENTS
6,650,363 B1 * 11/2003 Ukita ................... 348/223.1

| 6,930,711 B2 | 8/2005 | Fukui et al. |
| 2002/0135683 A1* | 9/2002 | Tamama et al. ............. 348/222 |
| 2004/0080639 A1* | 4/2004 | Ishiga ........................ 348/272 |
| 2005/0052546 A1* | 3/2005 | Nakabayashi et al. .... 348/223.1 |
| 2006/0114526 A1* | 6/2006 | Hasegawa ................... 358/518 |

FOREIGN PATENT DOCUMENTS
JP    2002-300590    10/2002

* cited by examiner

*Primary Examiner*—Lin Ye
*Assistant Examiner*—Dennis Hogue
(74) *Attorney, Agent, or Firm*—Oblon, Spivak, McClelland, Maier & Neustadt, P.C.

(57) ABSTRACT

A pixel signal of Bayer pattern output from an imaging device is subjected to interpolation in a pixel interpolation circuit, and converted into a YCbCr signal in a color space conversion circuit. A chroma value calculation circuit calculates a chroma value based on the pixel signal output from the imaging device. A look-up table converts the chroma value into a suppression signal. More specifically, when the chroma value is lower than a threshold value, the look-up table outputs a value lower than 1 as the suppression signal. The suppression signal is corrected in another look-up table, and then, works on Cr and Cb signals in multipliers. A signal in a low-chroma region is thereby suppressed.

20 Claims, 8 Drawing Sheets

IMAGE PROCESSOR

BACKGROUND OF THE INVENTION

1. Field of the Invention

The present invention relates to suppression of color aliasing caused by pixel interpolation.

2. Description of the Background Art

An imaging device such as CCD or CMOS used in a digital camera or the like photoelectrically transfers light received through a color filter to output a pixel signal. Such color filter includes an RGB color filter, a YMCK color filter and the like. A single-chip imaging device outputs a single-color pixel signal per pixel. For instance, when employing the RGB color filter, a pixel signal having one of R (red), G (green) and B (blue) color components is output per pixel.

Therefore, a pixel signal output from a single-chip color imaging device needs to be interpolated with pixel signals of other color components. Various algorithms are used in such interpolation. An exemplary method is to calculate a correlation in the horizontal direction and a correlation in the vertical direction to execute pixel interpolation using pixels present in either direction having a higher correlation. An alternative method is to execute pixel interpolation after assigning weights according to the distance between a target pixel and its neighboring pixels.

Further, Japanese Patent Application Laid-Open No. 2002-300590 describes generating color-difference signals by two different methods after execution of pixel interpolation, and selecting either of the color-difference signals based on chroma values of the respective color-difference signals.

To prevent color aliasing from occurring, various algorithms for executing pixel interpolation have been proposed, however, color aliasing cannot completely be eliminated. The above-mentioned JP2002-300590 describes generating color-difference signals by different methods and selecting either of the color-difference signals based on chroma values, which therefore produces a certain effect of reducing color aliasing, however, a color aliasing component created in the process of generating the selected signal is not suppressed.

SUMMARY OF THE INVENTION

An object of the present invention is to suppress a color aliasing component on the precondition that color aliasing occurs when interpolation processing is performed using various algorithms, to thereby reduce degradation in image quality.

A first aspect of the present invention is directed to an image processor comprising: a device configured to receive a pixel signal having only one color component in a predetermined color space per pixel; a device configured to calculate a chroma value of a peripheral region of a target pixel using the pixel signal of the target pixel and the pixel signal of a neighboring pixel of the target pixel; a device configured to perform pixel interpolation on the target pixel using the pixel signal of the neighboring pixel; and a device configured to perform suppression on the pixel signal having undergone the pixel interpolation when the chroma value is lower than a first threshold value.

This reduces degradation in image quality in a low-chroma region where color aliasing, when caused by pixel interpolation, is noticeable.

A second aspect of the invention is directed to an image processor comprising: a device configured to receive a pixel signal having only one color component in a predetermined color space per pixel; a device configured to calculate a chroma value of a peripheral region of a target pixel using the pixel signal of the target pixel and the pixel signal of a neighboring pixel of the target pixel; a device configured to perform pixel interpolation on the target pixel using the pixel signal of the neighboring pixel; a device configured to detect an edge magnitude of the target pixel; and a device configured to perform suppression on the pixel signal having undergone the pixel interpolation when the edge magnitude is higher than a second threshold value.

This reduces degradation in image quality in an edge region where color aliasing is likely to be caused by pixel interpolation.

A third aspect of the invention is directed to an image processor comprising: a device configured to receive a pixel signal having only one color component in a predetermined color space per pixel; a device configured to perform calculation of a chroma value of a peripheral region of a target pixel using the pixel signal of the target pixel and the pixel signal of a neighboring pixel of the target pixel; a device configured to perform pixel interpolation on the target pixel using the pixel signal of the neighboring pixel; and a device configured to perform suppression on the pixel signal having undergone the pixel interpolation when a brightness of the target pixel is higher than a third threshold value.

This reduces degradation in image quality in a highly bright region where color aliasing, when caused by pixel interpolation, is noticeable.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

A first preferred embodiment of the present invention will now be described in detail with reference to the accompanied drawings.

1. General Overall Construction of Digital Camera

Figure 1:
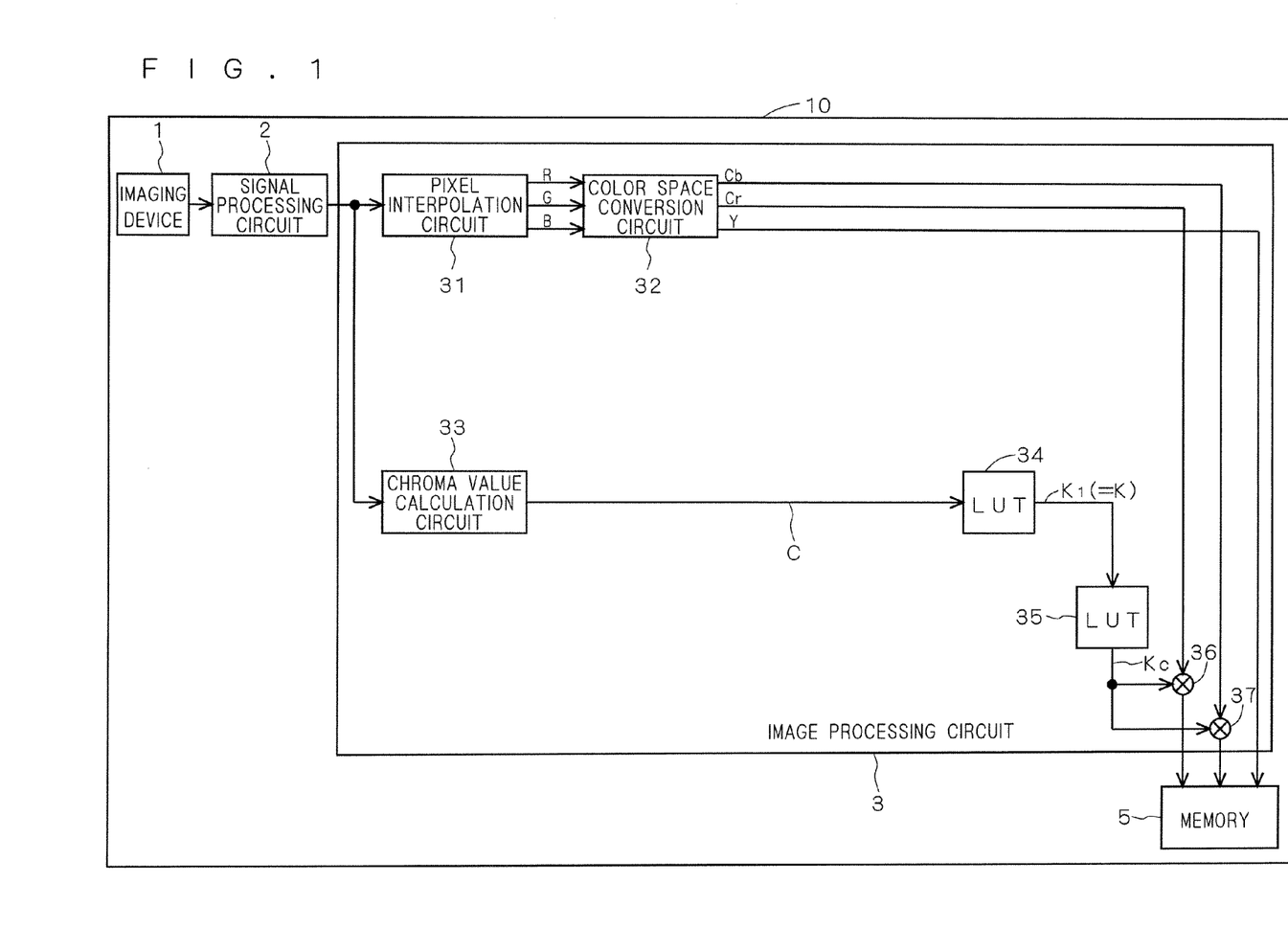
FIG. 1 is a block diagram illustrating a digital camera according to a first preferred embodiment of the present invention.

FIG. 1 is a block diagram illustrating a digital camera 10 according to a first preferred embodiment of the present invention. The digital camera 10 includes an imaging device 1, a signal processing circuit 2, an image processing circuit 3 and a memory 5. The imaging device 1 is a single-chip CCD having a color filter array of RGB Bayer pattern, and outputs a pixel signal of one of RGB color components per pixel. More specifically, assuming that a G signal and an R signal are output alternately like GRGR in an odd-numbered horizontal line, a B signal and a G signal are output alternately like BGBG in an even-numbered horizontal line. A CMOS sensor may be used as the imaging device 1.

A pixel signal output from the imaging device 1 is input to the signal processing circuit 2. The signal processing circuit 2 executes signal processing such as white balance and black level correction on the pixel signal. The pixel signal output from the signal processing circuit 2 is input to the image processing circuit 3. The image processing circuit 3 has a pixel interpolation circuit 31, a color space conversion circuit 32, a chroma value calculation circuit 33, look-up tables (hereinafter abbreviated to LUT) 34, 35 and multipliers 36 and 37.

The pixel interpolation circuit 31 executes pixel interpolation using pixel signals of a target pixel and its neighboring pixels. The color space conversion circuit 32 converts the color space of a pixel signal having undergone pixel interpolation. In this preferred embodiment, a pixel signal output from the imaging device 1 is in RGB color space, and a pixel signal having one of RGB color components is converted into a signal having three RGB color components per pixel in the pixel interpolation circuit 31. Then, the pixel signal having RGB color components is converted into a pixel signal in YCbCr color space in the color space conversion circuit 32. The chroma value calculation circuit 33, using pixel signals of a target pixel and its neighboring pixels, calculates a chroma value of that region, which will be discussed later in detail.

To perform a computation using pixel signals of a target pixel and its neighboring pixels, the pixel interpolation circuit 31 and chroma value calculation circuit 33 are each provided with a register group for accumulating pixel signals of an M×N matrix region. The circuits 31 and 33 may be configured to share registers between each other.

As described above, after execution of pixel interpolation in the image processing circuit 3, a signal having all RGB color components is output per pixel. The signal is further subjected to color space conversion to be converted into a pixel signal in YCbCr color space. The pixel signal is then subjected to color aliasing suppression which will be described later, and stored in the memory 5. The pixel signal stored in the memory 5 is further subjected to compression to be stored in a recording medium not shown, as image data. Alternatively, the pixel signal is used as data to be displayed on a monitor not shown but equipped with the digital camera 10.

2. Method of Depicting Pixels in Bayer Pattern

Figure 2A:
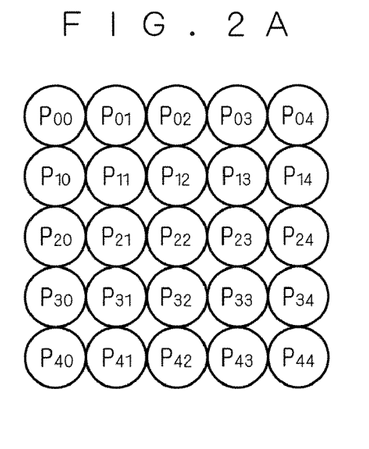
FIGS. 2A through 2E each illustrate pixel arrangement of RGB Bayer pattern.

Next, a method of depicting pixels in a Bayer pattern will be described. First, pixels of a 5×5 matrix region are depicted as shown in FIG. 2A. The character P in FIG. 2A is used without considering which one of R, G and B color components each pixel represents. In contrast, FIGS. 2B to 2E each illustrate pixels distinguishing their color components from one another. The character R represents a red pixel, G represents a green pixel and B represents a blue pixel. In FIGS. 2A through 2E, G pixels are circled by solid lines, and R and B pixels are circled by broken lines.

As to numerical subscripts with the respective characters P, R, G and B, the first digit denotes the row number of a pixel in a matrix region, and the second digit denotes the column number of a pixel in the matrix region. FIGS. 2A through 2E each illustrate pixel arrangement of a matrix region formed by 25 pixels $P_{00}$ to $P_{44}$ including a target pixel $P_{22}$. The characters P, R, G and B may each indicate a pixel value in the present and following preferred embodiments and numerical expressions. For instance, the character $P_{11}$ indicates a pixel itself located in the first column and first row as well as a pixel value of the pixel located in the first column and first row.

Figure 2B:
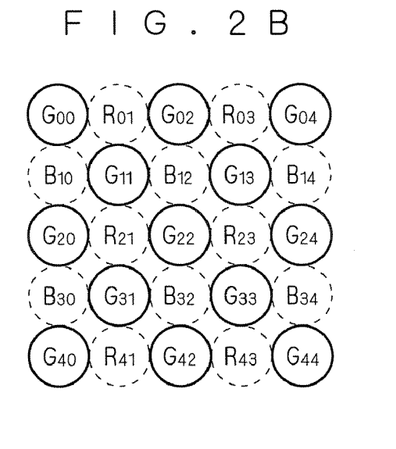
Figure 2C:
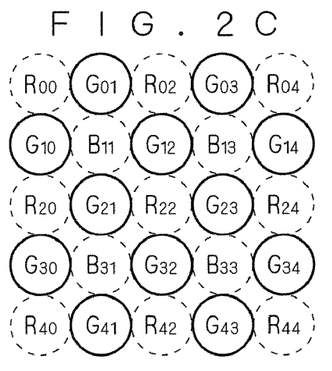
Figure 2D:
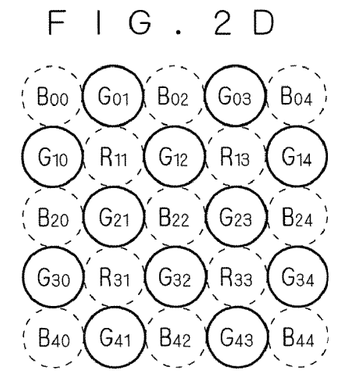
Figure 2E:
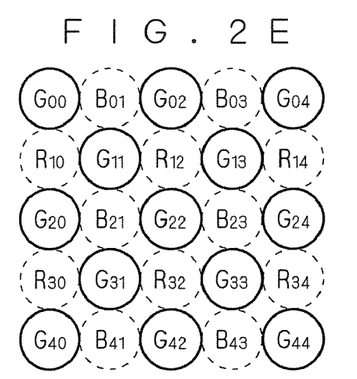

FIGS. 2B and 2E both illustrate pixel arrangement when the target pixel $P_{22}$ is a G pixel. FIG. 2C illustrates pixel arrangement when the target pixel $P_{22}$ is an R pixel. FIG. 2D illustrates pixel arrangement when the target pixel $P_{22}$ is a B pixel. As described above, the pixel interpolation circuit 31 and chroma value calculation circuit 33 each accumulate pixel signals of a matrix region in a register group in order to execute computations using pixel signals of the target pixel and its neighboring pixels. When pixels in a 5×5 matrix region are to be processed, there are four patterns of pixel signals stored in the register group as shown in FIGS. 2B to 2E. When pixels in a 3×3 matrix region are to be processed, nine pixels $P_{11}, P_{12}, P_{13}, P_{21}, P_{22}, P_{23}, P_{31}, P_{32}$ and $P_{33}$ centered around the target pixel $P_{22}$ are used, and patterns of pixel signals are also those four shown in FIGS. 2B to 2E.

3. Chroma Value Calculation

Next, chroma value calculation executed by the chroma value calculation circuit 33 will be described in detail. The chroma value calculation circuit 33 analyzes color-difference components in a matrix region including a target pixel to obtain a chroma value of this region.

The chroma value is calculated on the basis of a color-difference component between a G pixel level and an R pixel level and a color-difference component between a G pixel level and a B pixel level in the matrix region including the target pixel. Then, in the present embodiment, two color-difference component evaluation values are calculated to determine the chroma value. More specifically, the chroma value calculation circuit 33 calculates "a first color-difference component evaluation value" and "a second color-difference component evaluation value". The first color-difference component evaluation value is obtained from respective pixel average values per color component of pixels present in the matrix region without taking into account the position of the respective pixels in the matrix region. The second color-difference component evaluation value is obtained by accumulating color-difference component values in a particular direction taking into account the position of the respective pixels present in the matrix region.

The reason for calculating two color-difference component evaluation values as described above is as follows: in the case of employing the first color-difference component evaluation value as a chroma value, a gray image containing thin lines in the horizontal or vertical direction such as a RETMA chart may be misidentified as having a large chroma value as a color image. This is because, even though there is a strong correlation in the horizontal or vertical direction, a color-difference component value is calculated using pixel average values in the region without taking into account the correlation. Accordingly, in the present embodiment, two color-difference component evaluation values are calculated as will be described below, and either value having a lower color-difference component level is employed as a chroma value.

3-1. First Color-Difference Component Evaluation Value

First, a method of calculating the first color-difference component evaluation value will be described. The first color-difference component evaluation value is suitable for evaluation of a flat area (low-frequency region) such as blue sky or a wall having no pattern thereon. In this context, the flat area indicates a region having no strong correlation in any particular direction. To obtain the first color-difference component evaluation value, average values $R_{AVE}$, $G_{AVE}$ and $B_{AVE}$ of pixel values for respective RGB colors included in a 3×3 matrix region centered on the target pixel are calculated first. The average values $R_{AVE}$, $G_{AVE}$ and $B_{AVE}$ are generally expressed by the following equations (1). In the equations (1), the numbers of R, G and B pixels present in the matrix region are represented by $N_R$, $N_G$ and $N_B$, respectively, and the term of $\Sigma$ indicates a cumulative pixel value of each color component.

$$\begin{cases} R_{ave} = \dfrac{1}{N_R} \sum_i^{N_R} R_i \\ G_{ave} = \dfrac{1}{N_G} \sum_i^{N_G} G_i \\ B_{ave} = \dfrac{1}{N_B} \sum_i^{N_B} B_i \end{cases} \quad (1)$$

There are four patterns of pixel arrangement as shown in FIGS. 2B through 2E, and the method of calculating average values differs among the four patterns. First, the average values $R_{AVE}$, $G_{AVE}$ and $B_{AVE}$ are calculated by the expressions (2) when the target pixel is a G pixel and the pixel arrangement is that of FIG. 2B.

$$G_{ave} = \dfrac{G_{11} + G_{13} + G_{22} + G_{31} + G_{33}}{5} \quad (2)$$
$$R_{ave} = \dfrac{R_{21} + R_{23}}{2}$$
$$B_{ave} = \dfrac{B_{12} + B_{32}}{2}$$

The average values $R_{AVE}$, $G_{AVE}$ and $B_{AVE}$ are calculated by the expressions (3) when the target pixel is an R pixel and the pixel arrangement is that of FIG. 2C.

$$G_{ave} = \dfrac{G_{12} + G_{21} + G_{23} + G_{32}}{4} \quad (3)$$
$$R_{ave} = R_{22}$$
$$B_{ave} = \dfrac{B_{11} + B_{13} + B_{31} + B_{33}}{4}$$

The average values $R_{AVE}$, $G_{AVE}$ and $B_{AVE}$ are calculated by the expressions (4) when the target pixel is a B pixel and the pixel arrangement is that of FIG. 2D.

$$G_{ave} = \dfrac{G_{12} + G_{21} + G_{23} + G_{32}}{4} \quad (4)$$
$$R_{ave} = \dfrac{R_{11} + R_{13} + R_{31} + R_{33}}{4}$$
$$B_{ave} = R_{22}$$

The average values $R_{AVE}$, $G_{AVE}$ and $B_{AVE}$ are calculated by the expressions (5) when the target pixel is a G pixel and the pixel arrangement is that of FIG. 2E.

$$G_{ave} = \dfrac{G_{11} + G_{13} + G_{22} + G_{31} + G_{33}}{5} \quad (5)$$
$$R_{ave} = \dfrac{R_{12} + R_{32}}{2}$$
$$B_{ave} = \dfrac{B_{21} + B_{23}}{2}$$

The chroma value calculation circuit 33 performs a computation by any of the expressions (2) through (5) depending on which pattern of pixel arrangement shown in FIGS. 2B through 2E the matrix region has. Further, the chroma value calculation circuit 33 performs a computation expressed in the equation (6) using the obtained average values $R_{AVE}$, $G_{AVE}$ and $B_{AVE}$ to obtain a first color-difference component evaluation value $C_{global}$. More specifically, the color-difference component evaluation value $C_{global}$ is an evaluation value of a color-difference component calculated using color-difference component values obtained on the basis of each pixel average value per color component of pixels present in the matrix region.

$$C_{global} = \dfrac{|G_{ave} - R_{ave}| + |G_{ave} - B_{ave}|}{2} \quad (6)$$

3-2. Second Color-Difference Component Evaluation Value

Next, a method of calculating the second color-difference component evaluation value will be described. The second color-difference component evaluation value is suitable for evaluation of color-difference components in a matrix region where a particular direction has a strong correlation and whose chroma value greatly varies depending on the method of calculating color-difference component values. For instance, in the case of employing the first color-difference component evaluation value obtained as described in the paragraph 3-1 as a chroma value, a gray image containing high-frequency components such as a RETMA chart may be misidentified as having a large chroma value as a color image, as described above. Therefore, the following processing is executed to correct a color-difference component evaluation value for such an image having a strong correlation in a particular direction.

The chroma value calculation circuit 33 performs a computation expressed by the equations (7) and (8) using pixel signals of a 3×3 matrix region. More specifically, the equation (7) accumulates color-difference component values in the vertical direction to obtain a vertical color-difference component evaluation value $C_{vertical}$. The equation (8) accumulates color-difference component values in the horizontal direction to obtain a horizontal color-difference component evaluation value $C_{horizontal}$. That is, the computations expressed by the equations (7) and (8) are each intended to accumulate color-difference component values between G and R pixels and color-difference component values between G and B pixels in either the vertical or horizontal direction.

$$C_{vertical} = \dfrac{\begin{array}{c}|P_{11} - P_{21}| + |P_{21} - P_{31}| + 2|P_{12} - P_{22}| + \\ 2|P_{22} - P_{32}| + |P_{13} - P_{23}| + |P_{23} - P_{33}|\end{array}}{8} \quad (7)$$

-continued $$C_{horizontal} = \frac{|P_{11} - P_{12}| + |P_{12} - P_{13}| + 2|P_{21} - P_{22}| + 2|P_{22} - P_{23}| + |P_{31} - P_{32}| + |P_{32} - P_{33}|}{8} \quad (8)$$

The equations (7) and (8) both have terms multiplied by a coefficient of 2, which is intended to match the number of accumulation of G-R color-difference component values and the number of accumulation of G-B color-difference component values with each other. In the present embodiment, the coefficient of 2 is used, however, the coefficient may be changed as appropriate.

Further, the color-difference component evaluation values in the horizontal and vertical directions are calculated in the present embodiment, however, a color-difference component evaluation value in a diagonal direction may additionally be calculated to be used for evaluation.

3-3. Calculation of Chroma Coefficient

The chroma value calculation circuit 33 calculates the three color-difference component evaluation values $C_{global}$, $C_{vertical}$ and $C_{horizontal}$ by the methods described in the paragraphs of 3-1 and 3-2, and further performs a computation expressed by the equation (9) to obtain a minimum value among the color-difference component evaluation values $C_{global}$, $C_{vertical}$ and $C_{horizontal}$ (that is, a value having a minimum level of color-difference component). This minimum value is employed as a chroma value C of the matrix region to be processed. In other words, the chroma value C is a value determined in correspondence with each target pixel. In the equation (9), min(x, y, z) indicates a minimum value among x, y and z. As described above, a color-difference component evaluation value in a diagonal direction may be calculated as the second color-difference component evaluation value in addition to the values $C_{vertical}$ and $C_{horizontal}$. In this case, a minimum value shall be selected from among the evaluation values including the color-difference component evaluation value in the diagonal direction.

$$C = \min(C_{global}, C_{horizontal}, C_{vertical}) \quad (9)$$

4. Color Aliasing Suppression

Figure 3:
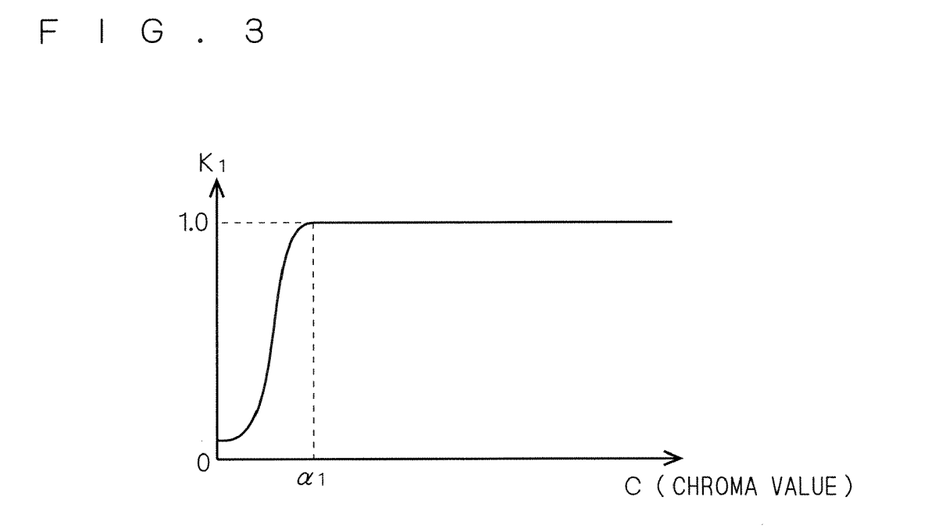
FIG. 3 illustrates the relationship between chroma value and suppression signal.

Color aliasing suppression will now be described. After calculation of the chroma value C for each target pixel, the chroma value calculation circuit 33 outputs the chroma value C to the LUT 34. The LUT 34 is a conversion circuit for calculating a suppression signal $K_1$ on the basis of the chroma value C. FIG. 3 illustrates the relationship between the chroma value C and suppression signal $K_1$. When the chroma value C is equal to or higher than a threshold value $\alpha_1$, the LUT 34 outputs 1 as the suppression signal $K_1$. In this case, the suppression signal $K_1$ does not suppress a pixel signal. When the chroma value C is lower than the threshold value $\alpha_1$, the LUT 34 outputs a value lower than 1 as the suppression signal $K_1$. In this case, the suppression signal $K_1$ serves to suppress a pixel signal. The threshold value $\alpha_1$ is intended to define the border of whether or not to suppress a signal, and set at an optimum value that makes color aliasing least noticeable based on experiments or experience. More specifically, setting the threshold value $\alpha_1$ higher than an optimum value, a signal will be suppressed even in an area where color aliasing is not noticeable, which adversely causes degradation in image quality. Setting the threshold value $\alpha_1$ lower than an optimum value, color aliasing will become noticeable in a low-chroma region. Accordingly, an optimum value is preferably determined maintaining the balance between these two conditions.

Figure 4:
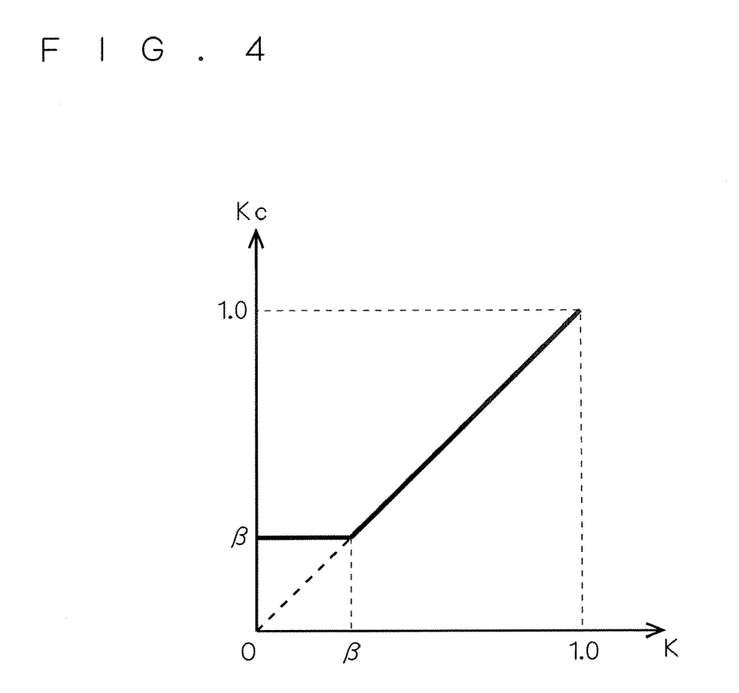
FIG. 4 illustrates the relationship between suppression signal and corrected suppression signal.

The LUT 35 is a conversion circuit for receiving a suppression signal K and outputting a corrected suppression signal $K_c$. In this first embodiment, the suppression signal $K_1$=K. FIG. 4 illustrates the relationship between the suppression signal K and corrected suppression signal $K_c$ converted in the LUT 35. As shown, when the suppression signal K is very low in value, the LUT 35 converts the suppression signal K to be a little higher. In the illustrated example, when the suppression signal K is lower than β, the LUT 35 outputs β as the corrected suppression signal $K_c$. The purpose of such conversion is to prevent the suppression processing from working excessively.

The corrected suppression signal $K_c$ output from the LUT 35 is input to the multipliers 36 and 37. The multiplier 36 receives a Cr signal output from the color space conversion circuit 32, and the multiplier 37 receives a Cb signal output from the color space conversion circuit 32. Then, the multiplier 36 multiplies the Cr signal by the corrected suppression signal $K_c$ to suppress the Cr signal, and the multiplier 37 multiplies the Cb signal by the corrected suppression signal $K_c$ to suppress the Cb signal.

As described, the LUT 34 outputs 1 as the suppression signal $K_1$ when the chroma value C is equal to or higher than the threshold value $\alpha_1$. In this case, the multipliers 36 and 37 output the input Cr and Cb signals as-is, respectively. When the chroma value C is lower than the threshold value $\alpha_1$, the LUT 34 outputs a value lower than 1 as the suppression signal $K_1$, and accordingly, the corrected suppression signal $K_c$ has a value lower than 1, so that the Cr and Cb signals are suppressed in the multipliers 36 and 37, respectively. In this manner, according to the present embodiment, color component signals (Cr and Cb signals) are subjected to the suppression processing when the chroma value of a target pixel is lower than a predetermined threshold value. This is because the presence of color aliasing, if existing in a low-chroma region, is noticeable. In other words, color component signals are output as-is for a region where color aliasing is not noticeable, and signal suppression is performed only for a region where color aliasing is noticeable. In this way, it is possible to make color aliasing caused by pixel interpolation least noticeable.

Second Preferred Embodiment

Figure 5:
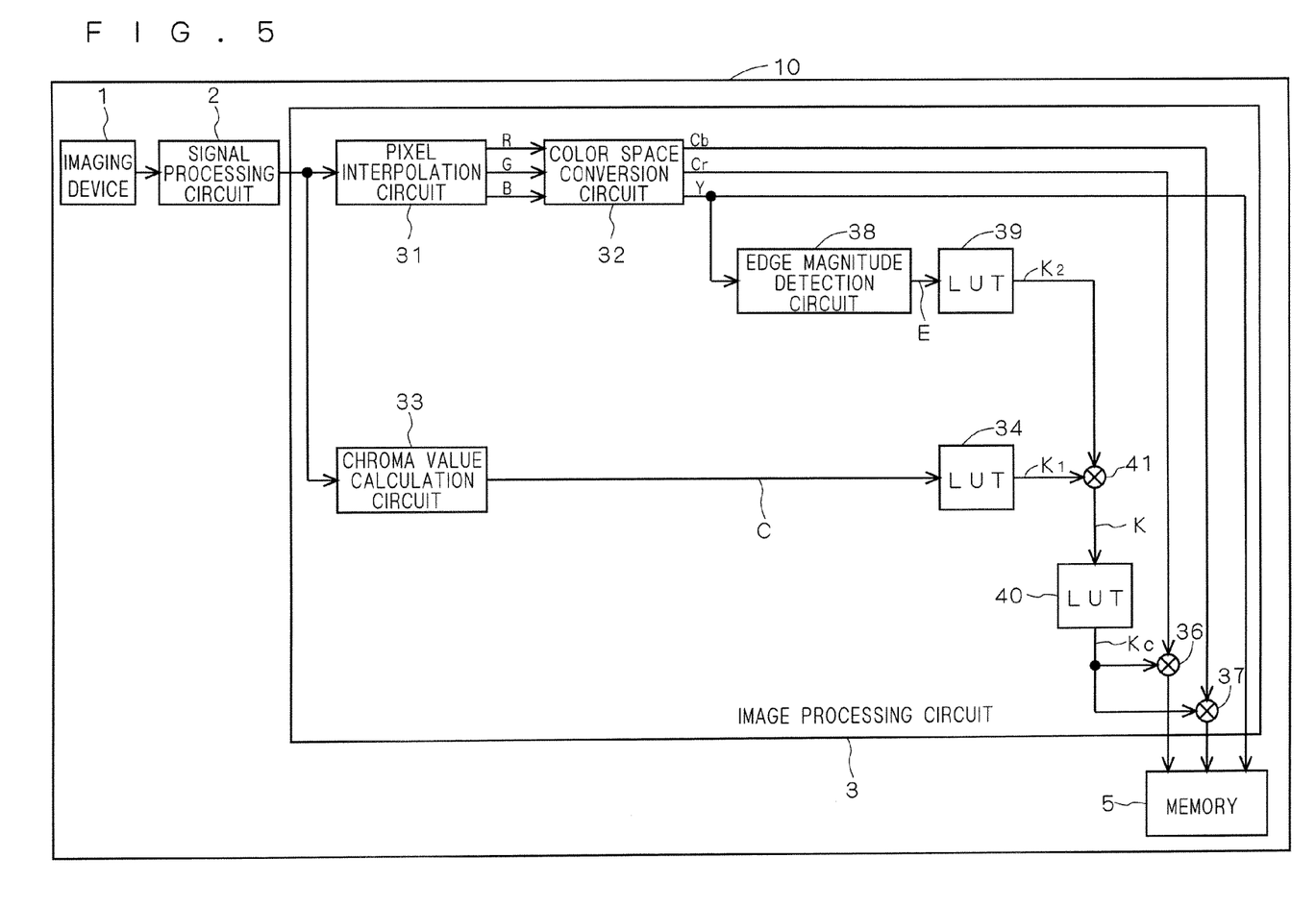
FIG. 5 is a block diagram illustrating a digital camera according to a second preferred embodiment of the invention.

A second preferred embodiment of the present invention will now be described. FIG. 5 is a block diagram illustrating a digital camera 10 according to the second preferred embodiment. In the drawing, elements similar to those of the first preferred embodiment are indicated by the same reference numerals. The present embodiment differs from the first preferred embodiment in that color aliasing suppression is also performed on the basis of edge magnitude.

A Y signal (luminance signal) of a pixel signal output from the color space conversion circuit 32 is input to an edge magnitude detection circuit 38. The edge magnitude detection circuit 38 is a circuit for calculating an edge magnitude in an image. The edge magnitude detection circuit 38 calculates an edge magnitude E of a target pixel using a SOBEL filter or a high-pass filter, for example. The calculated edge magnitude E is output to a LUT 39.

Figure 6:
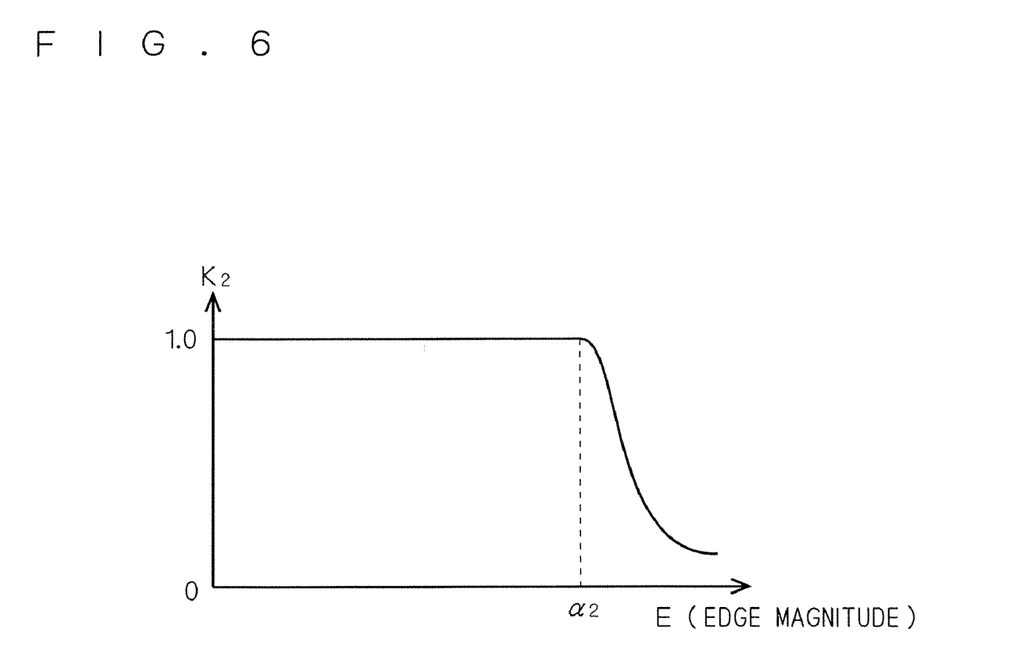
FIG. 6 illustrates the relationship between edge magnitude and suppression signal.

The LUT 39 is a conversion circuit for receiving the edge magnitude E and outputting a suppression signal $K_2$. FIG. 6 illustrates the relationship between the edge magnitude E and suppression signal $K_2$ converted in the LUT 39. When the edge magnitude E is equal to or lower than a threshold value $\alpha_2$, the LUT 39 outputs 1 as the suppression signal $K_2$. When the edge magnitude E is higher than the threshold value $\alpha_2$, the LUT 39 outputs a value lower than 1 as the suppression signal $K_2$. In short, the suppression signal $K_2$ serves to suppress a pixel signal when the edge magnitude E is higher than the threshold value $\alpha_2$.

The suppression signal $K_1$ output from the LUT 34 and the suppression signal $K_2$ output from the LUT 39 are multiplied in a multiplier 41, and the product is output to a LUT 40 as the suppression signal K. While the suppression signal $K=K_1$ in the first preferred embodiment, the suppression signal K is expressed as $K=K_1 \times K_2$ in the present embodiment. The LUT 40 is a conversion circuit performing similar processing as the LUT 35 described in the first preferred embodiment. The input-output relationship in the LUT 40 is similar to that shown in FIG. 4, and repeated illustration is therefore omitted. More specifically, as shown in FIG. 4, when the suppression signal K is lower than a predetermined threshold value, the suppression signal K is converted to be a little higher. In this manner, the LUT 40 receives the suppression signal $K=K_1 \times K_2$ and outputs the corrected suppression signal $K_c$. The corrected suppression signal $K_c$ works on color component signals (Cr and Cb signals) in the multipliers 36 and 37.

In the present embodiment, color component signals are suppressed in an edge region where color aliasing is likely to be caused by pixel interpolation. Accordingly, degradation in image quality can be reduced even when color aliasing occurs. More specifically, since pixel interpolation is performed on a target pixel using its neighboring pixels, color aliasing is more likely to occur in a region where a pixel signal varies sharply in value than in a region where a pixel signal varies smoothly in value. Accordingly, color aliasing can be made least noticeable in a region having a high edge magnitude by suppressing a pixel signal. The product of the suppression signals $K_1$ and $K_2$ output from the two look-up tables is used as the suppression signal K, and the suppression signal K is further reduced in value in a region where the chroma value is lower than the threshold value $\alpha_1$ and the edge magnitude is higher than the threshold value $\alpha_2$. It is therefore possible to more effectively minimize the influence of color aliasing exerted upon an image.

Of course, in the present embodiment, the suppression signal K is reduced in value only when either of the conditions is satisfied: the chroma value is lower than the threshold value $\alpha_1$; or the edge magnitude is higher than the threshold value $\alpha_2$, so that color aliasing is suppressed. In addition, when the two conditions are both satisfied, an image signal is suppressed to a larger extent, which prevents degradation in image quality.

Third Preferred Embodiment

Figure 7:
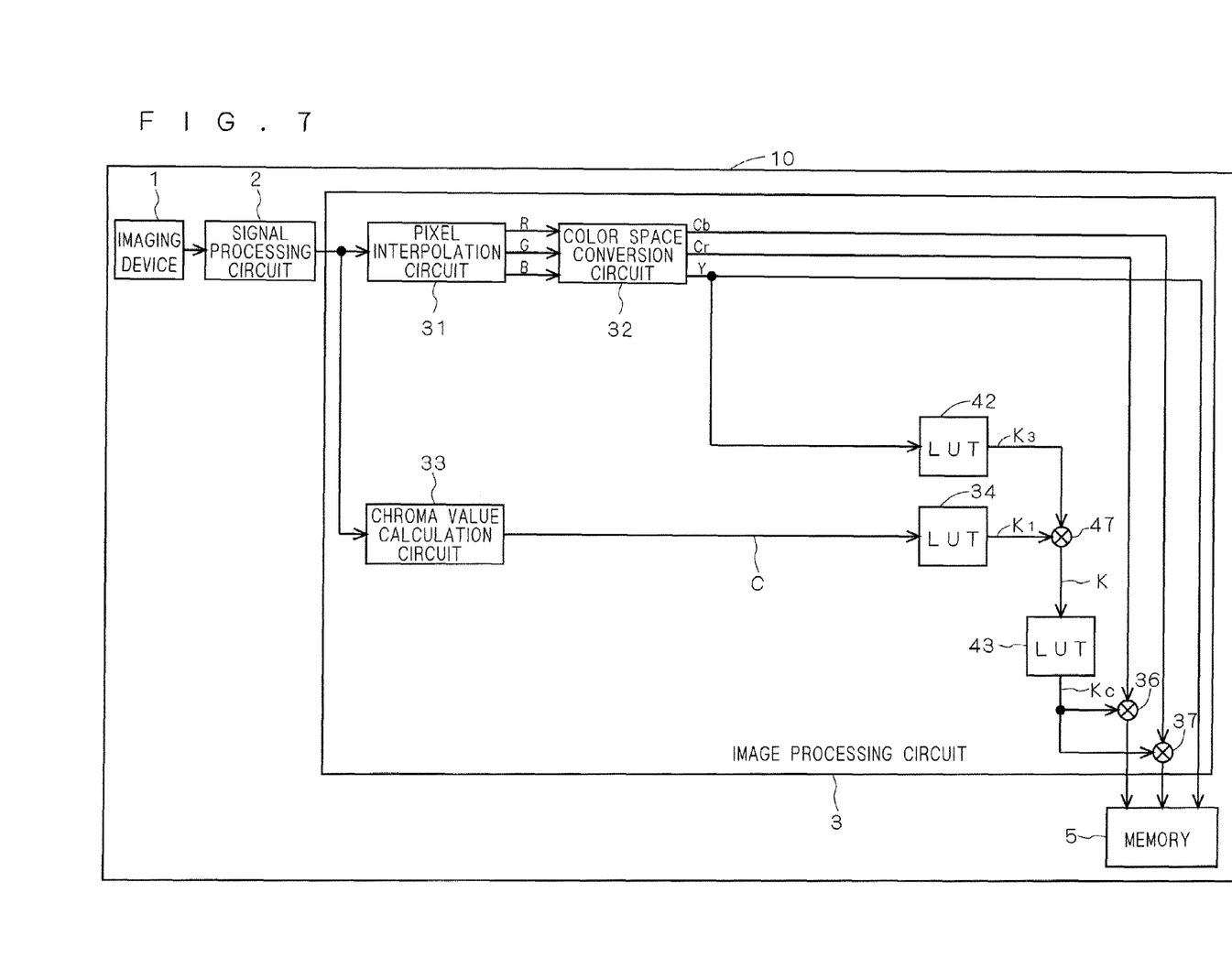
FIG. 7 is a block diagram illustrating a digital camera according to a third preferred embodiment of the invention.

A third preferred embodiment of the present invention will now be described. FIG. 7 is a block diagram illustrating a digital camera 10 according to the third preferred embodiment. In the drawing, elements similar to those of the first preferred embodiment are indicated by the same reference numerals. The present embodiment differs from the first preferred embodiment in that color aliasing suppression is performed on the basis of brightness of an image.

Figure 8:
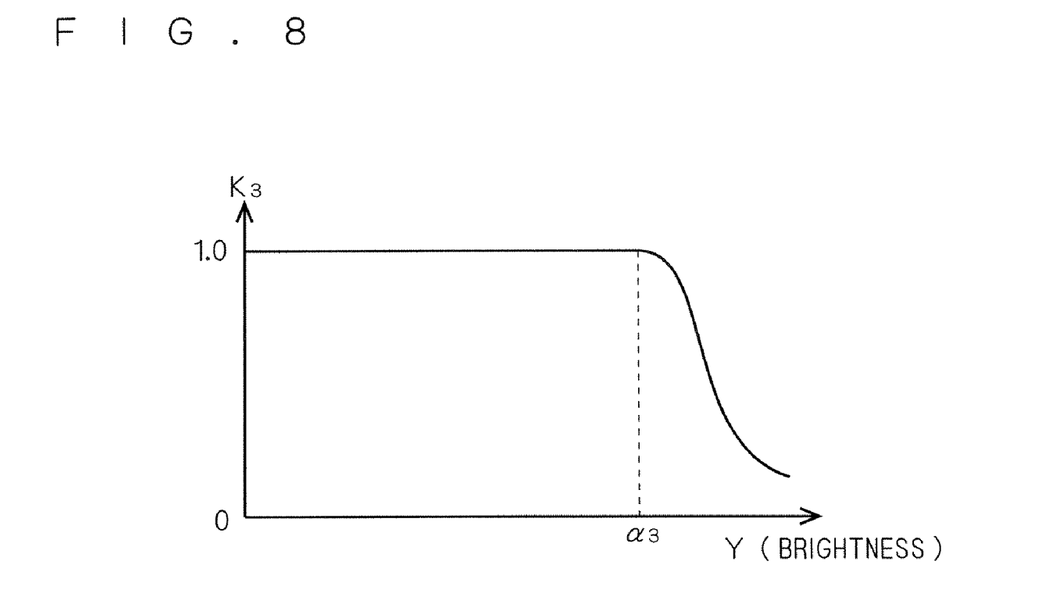
FIG. 8 illustrates the relationship between brightness and suppression signal.

A Y signal (luminance signal) of a pixel signal output from the color space conversion circuit 32 which indicates brightness of an image is input to a LUT 42. The LUT 42 is a conversion circuit for receiving the Y signal and outputting a suppression signal $K_3$. FIG. 8 illustrates the relationship between the brightness (luminance signal Y) and suppression signal $K_3$ converted in the LUT 42. When the brightness is equal to or lower than a threshold value $\alpha_3$, the LUT 42 outputs 1 as the suppression signal $K_3$, and when the brightness is higher than the threshold value $\alpha_3$, the LUT 42 outputs a value lower than 1 as the suppression signal $K_3$. In other words, the suppression signal $K_3$ serves to suppress a pixel signal when the brightness is higher than the threshold value $\alpha_3$.

The suppression signal $K_1$ output from the LUT 34 and the suppression signal $K_3$ output from the LUT 42 are multiplied in a multiplier 44, and the product is output to a LUT 43 as the suppression signal K. While the suppression signal $K=K_1$ in the first preferred embodiment, the suppression signal $K=K_1 \times K_3$ in the present embodiment. The LUT 43 is a conversion circuit performing similar processing as the LUT 35 described in the first preferred embodiment. The input-output relationship in the LUT 43 is similar to that shown in FIG. 4, and repeated illustration is therefore omitted. More specifically, as shown in FIG. 4, when the suppression signal K is lower than a predetermined threshold value, the suppression signal K is converted to be a little higher. In this manner, the LUT 43 receives the suppression signal $K=K_1 \times K_3$ and outputs the corrected suppression signal $K_c$. The corrected suppression signal $K_c$ works on color component signals (Cr and Cb signals) in the multipliers 36 and 37.

In the present embodiment, color component signals are suppressed in a highly bright region where color aliasing caused by pixel interpolation is easy to see. Accordingly, degradation in image quality can be reduced even when color aliasing occurs. The product of the suppression signals $K_1$ and $K_3$ respectively output from the two look-up tables is used as the suppression signal K, and the suppression signal K is further reduced in value in a region where the chroma value is lower than the threshold value $\alpha_1$ and the brightness is higher than the threshold value $\alpha_3$. It is therefore possible to more effectively minimize the influence of color aliasing exerted upon an image.

Of course, in the present embodiment, the suppression signal K is reduced in value only when either of the conditions is satisfied: the chroma value is lower than the threshold value $\alpha_1$; or the brightness is higher than the threshold value $\alpha_3$, so that color aliasing is suppressed. In addition, when the two conditions are both satisfied, an image signal can be suppressed to a larger extent, which prevents degradation in image quality.

Fourth Preferred Embodiment

Figure 9:
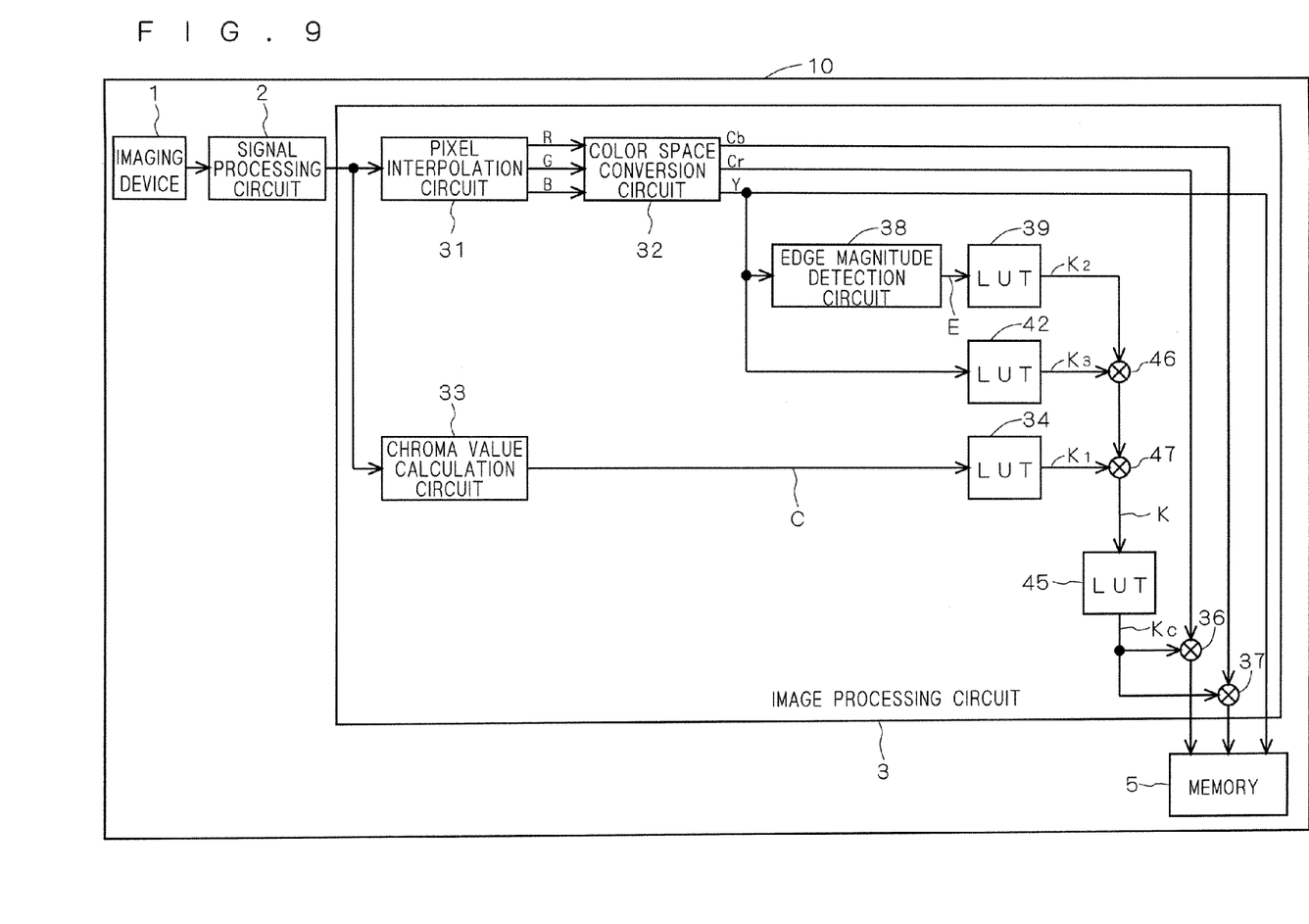
FIG. 9 is a block diagram illustrating a digital camera according to a fourth preferred embodiment of the invention.

A fourth preferred embodiment of the present invention will now be described. FIG. 9 is a block diagram illustrating a digital camera 10 according to the fourth preferred embodiment. The present embodiment combines features of the second and third preferred embodiments.

A Y signal (luminance signal) output from the color space conversion circuit 32 is input to the LUT 39 and 42, and converted into the suppression signals $K_2$ and $K_3$. The suppression signals $K_2$ and $K_3$ are multiplied in a multiplier 46, and the product is multiplied by the suppression signal $K_1$ in a multiplier 47. While the suppression signal $K=K_1$ in the first preferred embodiment, the suppression signal $K=K_1 \times K_2 \times K_3$ in the present embodiment. A LUT 45 is a conversion circuit performing similar processing as the LUT 35 described in the first preferred embodiment. The input-output relationship in the LUT 45 is similar to that shown in FIG. 4, and repeated illustration is therefore omitted. More specifically, as shown in FIG. 4, when the suppression signal K is lower than a predetermined threshold value, the suppression signal K is converted to be a little higher. In this manner, the LUT 45 receives the suppression signal $K=K_1 \times K_2 \times K_3$ and outputs the corrected suppression signal $K_c$. The corrected suppression signal $K_c$ works on color component signals (Cr and Cb signals) in the multipliers 36 and 37.

In the present embodiment, the product of the suppression signals $K_1$, $K_2$ and $K_3$ output from the three look-up tables is used as the suppression signal K, and the suppression signal K is further reduced in value in a region where the chroma value is lower than the threshold value $\alpha_1$, the edge magnitude is higher than the threshold value $\alpha_2$, and the brightness is higher than the threshold value $\alpha_3$. It is therefore possible to more effectively minimize the influence of color aliasing exerted upon an image.

Of course, in the present embodiment, the suppression signal K is reduced in value only if any of the conditions is satisfied: the chroma value is lower than the threshold value $\alpha_1$, or the edge magnitude is higher than the threshold value $\alpha_2$; or the brightness is higher than the threshold value $\alpha_3$, so that color aliasing is suppressed. In addition, when the three conditions are all satisfied, an image signal can be suppressed to a larger extent, which prevents degradation in image quality.

According to the above respective preferred embodiments, pixel signals output from the imaging device 1 are of RGB Bayer pattern, however, the image processor according to the present invention is also applicable to various types of pixel signals such as those output from an imaging sensor equipped with a complementary color filter array, and the like.

Further, according to the above respective preferred embodiments, the color space conversion circuit 32 outputs pixel signals in YCbCr color space, however, the present invention is also applicable to various color spaces such as YIQ color space, YUV color space, XYZ color space, HVC color space, etc. When the color space conversion circuit 32 outputs an image in any of these alternative color spaces, the edge magnitude and brightness may also be obtained using the luminance signal. Alternatively, the edge magnitude and brightness may be obtained using a G signal of an image in RGB color space before color space conversion.

Furthermore, according to the above preferred embodiments, the chroma value calculation circuit 33 calculates the first color-difference component evaluation value and the second color-difference component evaluation value, and adopts either one having a smaller value as a chroma value. This is to prevent misjudgment of chroma value. The use of two chroma values is therefore effective at implementing the present invention, which, however, is not indispensable. A commonly-adopted method of calculating a chroma value may be employed.

While the invention has been shown and described in detail, the foregoing description is in all aspects illustrative and not restrictive. It is therefore understood that numerous modifications and variations can be devised without departing from the scope of the invention.

What is claimed is:

1. An image processor comprising:
   a device configured to receive a pixel signal having only one color component in a predetermined color space per pixel;
   a device configured to calculate a chroma value of a peripheral region of a target pixel using said pixel signal of said target pixel and said pixel signal of a neighboring pixel of said target pixel by comparing a color-difference component evaluation value and a particular-direction color-difference component evaluation value, the particular-direction color-difference component evaluation value being obtained by accumulating pixel difference values in a predetermined direction without considering which color component said neighboring pixel has;
   a device configured to perform pixel interpolation on said target pixel using said pixel signal of said neighboring pixel; and
   a device configured to perform suppression on said pixel signal having undergone said pixel interpolation when said chroma value is lower than a first threshold value.

2. An image processor comprising:
   a device configured to receive a pixel signal having only one color component in a predetermined color space per pixel;
   a device configured to calculate a chroma value of a peripheral region of a target pixel using said pixel signal of said target pixel and said pixel signal of a neighboring pixel of said target pixel by comparing a color-difference component evaluation value and a particular-direction color-difference component evaluation value, the particular-direction color-difference component evaluation value being obtained by accumulating pixel difference values in a predetermined direction without considering which color component said neighboring pixel has;
   a device configured to perform pixel interpolation on said target pixel using said pixel signal of said neighboring pixel;
   a device configured to detect an edge magnitude of said target pixel; and
   a device configured to perform suppression on said pixel signal having undergone said pixel interpolation when said edge magnitude is higher than a first threshold value.

3. An image processor comprising:
   a device configured to receive a pixel signal having only one color component in a predetermined color space per pixel;
   a device configured to perform calculation of a chroma value of a peripheral region of a target pixel using said pixel signal of said target pixel and said pixel signal of a neighboring pixel of said target pixel by comparing a color-difference component evaluation value and a particular-direction color-difference component evaluation value, the particular-direction color-difference component evaluation value being obtained by accumulating pixel difference values in a predetermined direction without considering which color component said neighboring pixel has;
   a device configured to perform pixel interpolation on said target pixel using said pixel signal of said neighboring pixel; and
   a device configured to perform suppression on said pixel signal having undergone said pixel interpolation when a brightness of said target pixel is higher than a first threshold value.

4. The image processor according to claim 1, further comprising:
   a device configured to detect an edge magnitude of said target pixel; and
   a device configured to perform suppression on said pixel signal having undergone said pixel interpolation when said edge magnitude is higher than a second threshold value.

5. The image processor according to claim 1, further comprising
   a device configured to perform suppression on said pixel signal having undergone said pixel interpolation when a brightness of said target pixel is higher than a second threshold value.

6. The image processor according to claim 1, further comprising
   a device configured to perform suppression on said pixel signal having undergone said pixel interpolation when a brightness of said target pixel is higher than a second threshold value.

7. The image processor according to claim 4, further comprising
   a device configured to perform suppression on said pixel signal having undergone said pixel interpolation when a brightness of said target pixel is higher than a third threshold value.

8. The image processor according to claim 1, further comprising
   a device configured to convert said pixel signal having undergone said pixel interpolation into a luminance signal and a color component signal, wherein
   said suppression is performed on said color component signal.

9. The image processor according to claim 2, further comprising
   a device configured to convert said pixel signal having undergone said pixel interpolation into a luminance signal and a color component signal, wherein
   said suppression is performed on said color component signal.

10. The image processor according to claim 3, further comprising
    a device configured to convert said pixel signal having undergone said pixel interpolation into a luminance signal and a color component signal, wherein
    said suppression is performed on said color component signal.

11. The image processor according to claim 4, further comprising
    a device configured to convert said pixel signal having undergone said pixel interpolation into a luminance signal and a color component signal, wherein
    said suppression is performed on said color component signal.

12. The image processor according to claim 5, further comprising
    a device configured to convert said pixel signal having undergone said pixel interpolation into a luminance signal and a color component signal, wherein
    said suppression is performed on said color component signal.

13. The image processor according to claim 6, further comprising
    a device configured to convert said pixel signal having undergone said pixel interpolation into a luminance signal and a color component signal, wherein
    said suppression is performed on said color component signal.

14. The image processor according to claim 7, further comprising
    a device configured to convert said pixel signal having undergone said pixel interpolation into a luminance signal and a color component signal, wherein
    said suppression is performed on said color component signal.

15. The image processor according to claim 1, wherein the device configured to calculate said chroma value is configured to calculate said color-difference component evaluation value on the basis of each pixel average value per color component using said neighboring pixels, is configured to compare said color-difference component evaluation value and said particular-direction color-difference component evaluation value, and is configured to select one having the smallest difference value as said chroma value.

16. The image processor according to claim 15, wherein
    in calculation of said particular-direction color-difference component evaluation value, said pixel difference values are accumulated for each of a plurality of different directions without considering which color component said neighboring pixel has, to thereby obtain said particular-direction color-difference component evaluation value for each of said plurality of directions, and
    in selection of said chroma value, said color-difference component evaluation value and said particular-direction color-difference component evaluation value obtained for each of said plurality of directions are compared, and one having the smallest value is selected as said chroma value.

17. The image processor according to claim 2, wherein the device configured to calculate said chroma value is configured to calculate said color-difference component evaluation value on the basis of each pixel average value per color component using said neighboring pixels, is configured to compare said color-difference component evaluation value and said particular-direction color-difference component evaluation value, and is configured to select one having the smallest difference value as said chroma value.

18. The image processor according to claim 17, wherein
    in calculation of said particular-direction color-difference component evaluation value, said pixel difference values are accumulated for each of a plurality of different directions without considering which color component said neighboring pixel has, to thereby obtain said particular-direction color-difference component evaluation value for each of said plurality of directions, and
    in selection of said chroma value, said color-difference component evaluation value and said particular-direction color-difference component evaluation value obtained for each of said plurality of directions are compared, and one having the smallest value is selected as said chroma value.

19. The image processor according to claim 3, wherein the device configured to perform said calculation of said chroma value is configured to calculate said color-difference evaluation value on the basis of each average pixel value per color component using said neighboring pixels, is configured to compare said color-difference evaluation value and said particular-direction difference evaluation value, and is configured to select one having the smallest difference value as said chroma value.

20. The image processor according to claim 19, wherein
    in calculation of said particular direction difference evaluation value, pixel difference values are accumulated for each of a plurality of different directions without considering which color component said neighboring pixel has, to thereby obtain said particular-direction difference evaluation value for each of said plurality of directions, and
    in selection of said chroma value, said color-difference evaluation value and said particular-direction difference evaluation value obtained for each of said plurality of directions are compared, and one having the smallest value is selected as said chroma value.

* * * * *